H. B. OSGOOD & G. AYRES.
WEIGHING APPARATUS.
APPLICATION FILED SEPT. 17, 1907.
1,007,231.
Patented Oct. 31, 1911.
3 SHEETS—SHEET 2.
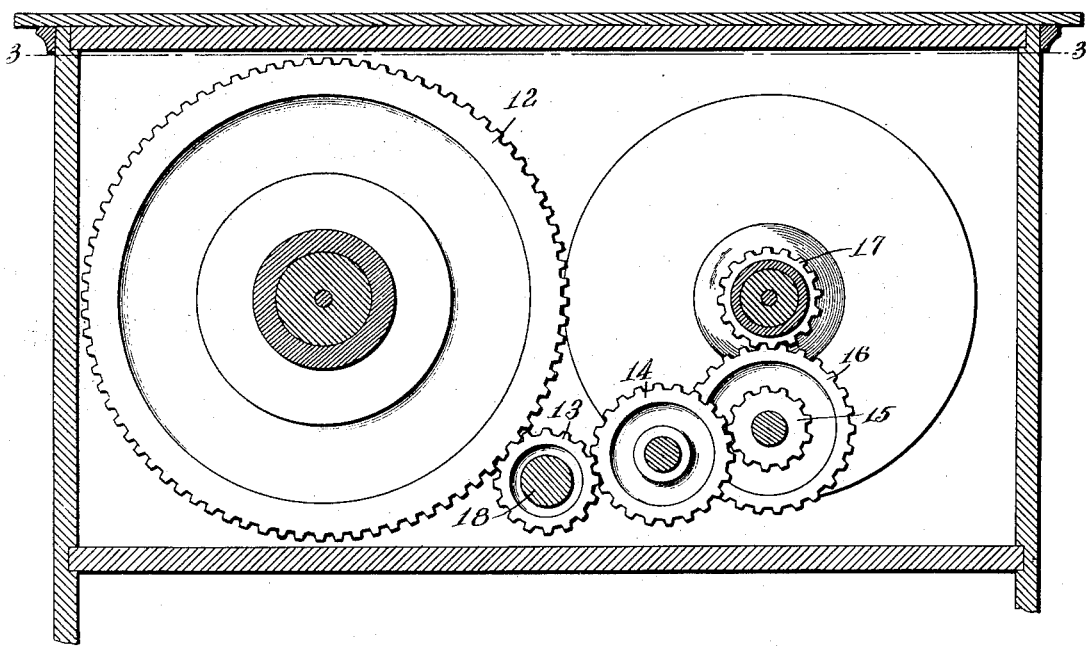
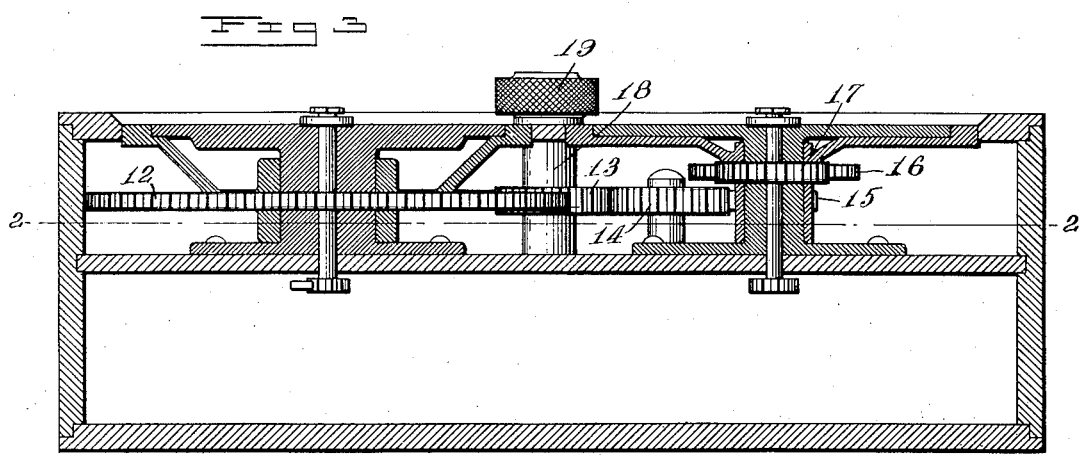
Inventors
Horatio Bonar Osgood
Gustav Ayres
Witnesses
H. A. Robinette
E. M. Jeffrey
By G. Ayres
Attorney

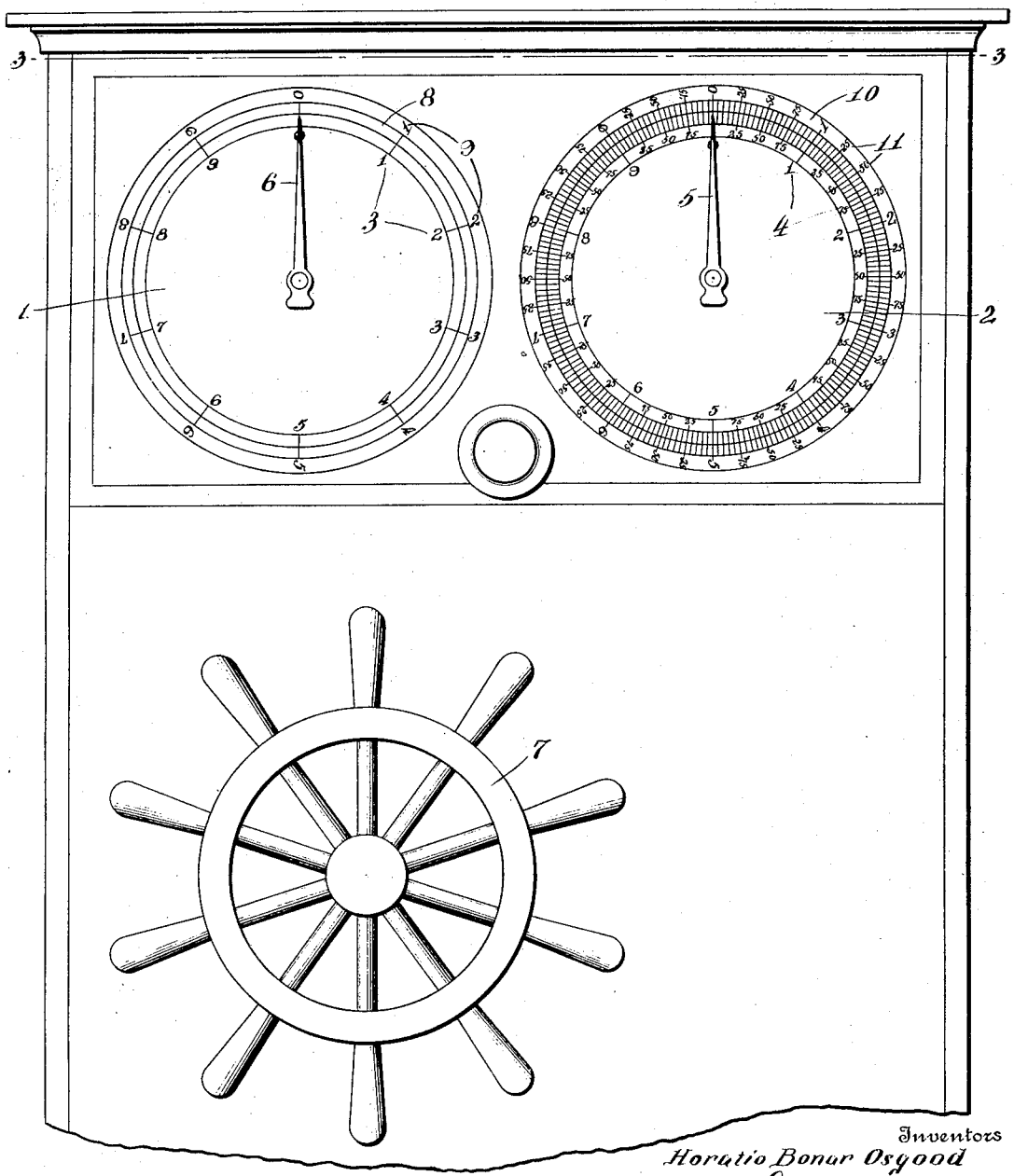

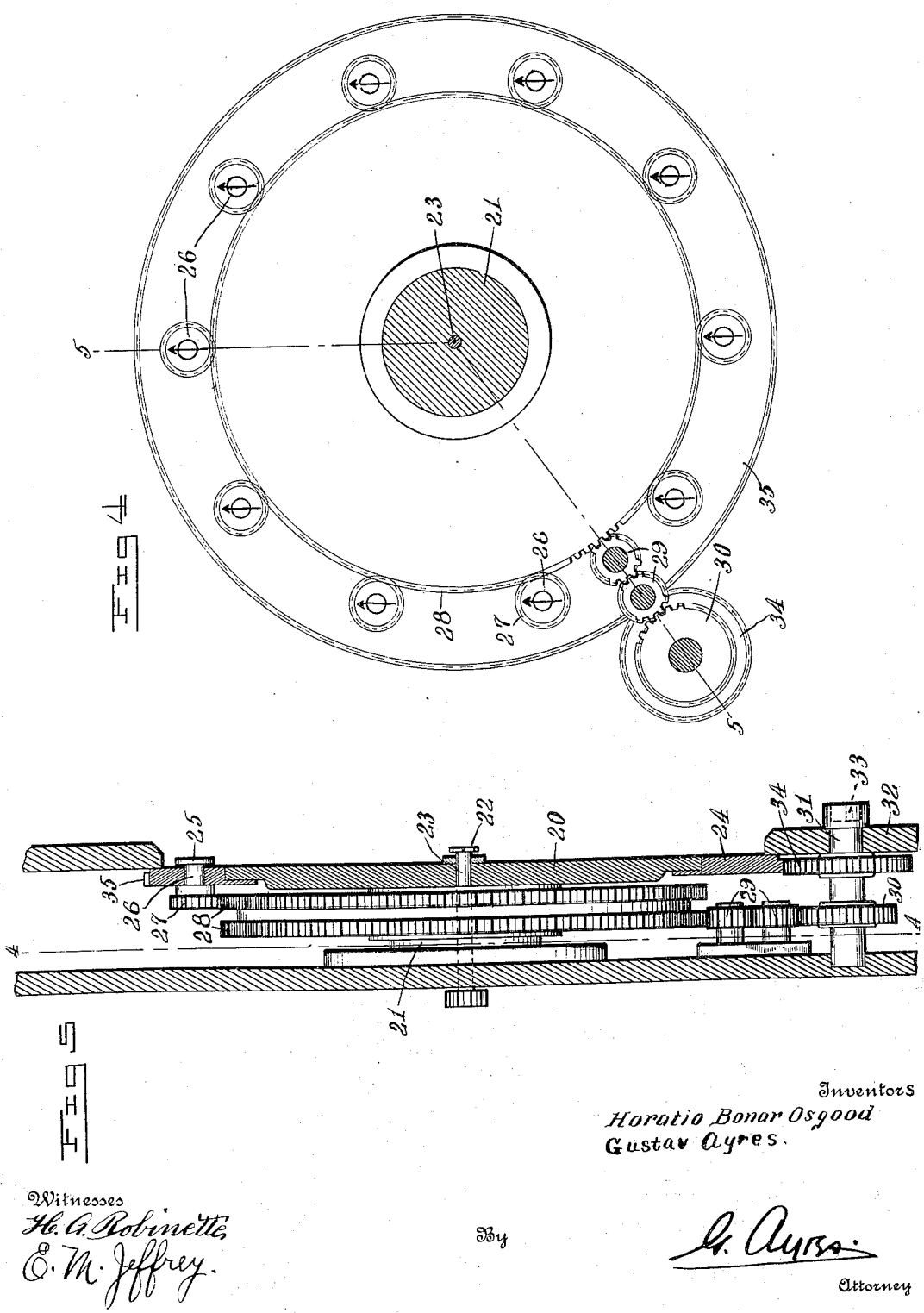

UNITED STATES PATENT OFFICE.

HORATIO BONAR OSGOOD, OF BINGHAMTON, NEW YORK, AND GUSTAV AYRES, OF WASHINGTON, DISTRICT OF COLUMBIA, ASSIGNORS, BY DIRECT AND MESNE ASSIGNMENTS, TO OSGOOD SCALE COMPANY, OF BINGHAMTON, NEW YORK, A CORPORATION OF NEW YORK.

WEIGHING APPARATUS.

1,007,231. Specification of Letters Patent. Patented Oct. 31, 1911.

Application filed September 17, 1907. Serial No. 393,285.

*To all whom it may concern:*

Be it known that we, HORATIO BONAR OSGOOD, a citizen of the United States, residing at Binghamton, county of Broome, State of New York, and GUSTAV AYRES, a citizen of the United States, residing at Washington, in the District of Columbia, have invented certain new and useful Improvements in Weighing Apparatus, of which the following is a specification.

Our invention relates to improvements in weighing apparatus, and it consists in the constructions, combinations and arrangements herein described and claimed.

The object of our invention is to provide an improved scale provided with gage dials, in which the net weight of any portion of the scale loading can be read directly from the dial.

Our invention is especially advantageous for all commercial uses where allowance is required for the tare or weight of a receptacle containing the material to be weighed; such as in freight yards, coal yards, etc.

Our invention is further especially adapted in cases where for the sake of convenience or other purpose it is desired to determine the exact weight of various independent loads placed successively on the scale platform without removal of the previously weighed loads. This constitutes a very convenient construction for express offices and freight offices, since it enables an entire truck load of separate articles to be accurately weighed by placing them successively on the scale platform without removing the previously weighed articles, thereby avoiding the necessity of removing each article from the scale platform as weighed.

Our invention is particularly adapted in cases in which predetermined weights of different articles are to be assembled or mixed together; as in concrete mills, etc.

In the accompanying drawings, forming a part of this application and in which similar reference symbols indicate corresponding parts in the several views—Figure 1 is a detail front elevation of a scale casing provided with two dial gages 1 and 2; Fig. 2 is a sectional view on the line 2—2 of Fig. 3; Fig. 3 is a sectional view on the line 3—3 of Figs. 1 and 2; Fig. 4 is a sectional view on the line 4—4 of Fig. 5, illustrating a modified construction; and Fig. 5 is a sectional view on the line 5—5 of Fig. 4.

Referring especially to Figs. 1, 2 and 3 of the drawings, 1 indicates an integer gage provided with indexes 3 comprising a series of division marks for indicating any integer units of scale loading; for example, each index division may indicate 1000 pounds of scale loading.

2 represents a fractional gage provided with indexes 4 comprising a series of division marks for indicating fractional portions of the integer units of the gage 1. We have shown the fractional gage having a total capacity of 1000 pounds, and provided with ten successively arranged duplicate series of index marks, each of which series indicates 100 pounds and fractions thereof.

From the above description, it will be understood that the gage pointer 5 of the fractional gage will make one complete revolution while the gage pointer 6 of the integer gage is passing through one-tenth of a revolution from its zero position to index #1. The scale is provided with a hand wheel 7 for operating the fractional gage at any scale loading within the capacity of the integer gage, in a manner fully described in an application for Letters Patent #346571 filed by us on or about December 6, 1906.

A ring 8 is adjustably mounted on the integer gage and provided with a series of index marks 9 corresponding with the index of said gage, and adapted to be normally shifted into registry therewith, as shown in Fig. 1. A similar ring 10 is adjustably mounted on the fractional gage and provided with a series of index marks 11 corresponding to the index of said gage.

A spur gear 12 is rigidly secured to the adjustable ring 8, and connected by a train of gearing 13, 14, 15 and 16 with a spur gear 17 rigidly connected to the adjustable ring 10; said gear train being proportioned to produce one complete rotation of the adjustable ring 10 of the fractional gage for each one-tenth rotation of the adjustable ring 8 of the integer gage. Such shifting of the adjustable rings can be conveniently produced in any desired manner, as by providing the spindle 18 of one of the gearing with a hand grip 19 exterior to the scale casing.

In the employment of our invention in freight yards, the loaded car is placed on the scale, and the spindle 18 manually turned to shift the adjustable members 8 and 10 sufficiently to bring the zero index marks of said members in registry with the index marks on the respective gages indicating the known weight of the empty car. The net weight of the load contained in the car will then be idicated directly on the indexes of the shiftable members by the gage pointers 5 and 6. In cases in which the weight of the car is not known, the empty car is placed on the scale, and the adjustable members 8 and 10 shifted to bring their zero index marks in registry with the respective gage pointers in the positions assumed by the latter under the weight of the car. The car can then be loaded while on the scale, or again placed on the scale after being loaded, and the net weight of such load will be directly indicated then on the indexes of the shiftable members by the gage pointers 5 and 6. In commercial uses which render it necessary or desirable to determine the exact weight of various loads placed successively on the scale without removal of the previously weighed loads, the initial load is placed on the load and its weight indicated on the indexes of the respective gages by the pointers 5 and 6. The adjustable members 8 and 10 are then shifted sufficiently to bring the zero indexes on said members in registry with the respective gage pointers in the positions they have assumed under the weight of such initial load. The second load is then placed on the scale, and the net weight of said load will be directly indicated on the indexes of the shiftable members by the gage pointers 5 and 6. The remaining loads are then placed successively on the scale; the adjustable members 8 and 10 being shifted to bring their zero index marks in registry with the gage pointers 5 and 6 after the net weight of each load has thus been determined.

The employment of our indexed adjustable members 8 and 10 has under certain conditions proved somewhat undesirable and confusing, due to the fact that the numerals on the indexes of said members make a complete revolution about their axes during one revolution of said members; the position of the top and bottom of each numeral being transposed when said numeral is shifted through a half revolution. Figs. 4 and 5 illustrate a very simple and efficient construction of the fractional gage for overcoming this defect. In this construction, the index dial 20 of the gage is stationarily supported on a cylindrical base 21; the gage pointer 22 being secured to a spindle 23 rotatably mounted in said base and extending from the rear thereof for actuation in the usual manner.

A ring 24 is rotatably mounted on the dial 20, and provided with a series of index numerals 25 corresponding with the numerals of the gage index. Each numeral 25 is carried by a spindle 26 journaled in the ring 24 and having a pinion 27 secured to its rear end. The pinions 27 of the several numerals are thus arranged in a concentric series meshing with a spur wheel 28, which latter is driven through a pair of idlers 29 meshing with a drive wheel 30.

The wheel 30 is secured to an actuating shaft 31, which extends through the front wall 32 of the scale casing and is shown provided with a socket 33 to receive a handle for manually rotating said shaft. A second drive wheel 34 is secured to the shaft 31, and meshes with an annular series of spur teeth 35 extending from the outer periphery of the adjustable ring 24.

In the example illustrated, we have shown the several gears proportioned as follows: drive gear 30 provided with 22 teeth, spur gear 28 provided with 100 teeth, pinions 27 provided with 10 teeth, gear 34 provided with 26 teeth, and adjustable ring 24 provided with 130 teeth. With such proportions of the gear trains, it will be clear that five revolutions of the actuating shaft 31 will cause one complete revolution of the adjustable ring 24, and simultaneously turn the spur gear 28 through one and one-tenth revolutions. The gear 28 being formed with 100 teeth, the one-tenth extra revolution thereof will produce a complete reverse rotation of each of the pinions 27 while being shifted through a full revolution by the rotatable ring 24. Hence, the pinions 27 and the numerals 25 secured thereto will be maintained against any absolute rotation about their axes, and the several numerals will be constantly maintained in an upright position in any of the adjusted positions of the ring 24. In this modified construction, the adjustable ring of the integer gage is driven from the spur wheels 30 and 34 through trains of gearing similar to that just described, but proportioned to produce the desired relative rotation between the adjustable rings of the two gages.

We have illustrated and described preferred and satisfactory constructions, but, obviously, changes could be made within the scope of our invention.

Having thus described our invention, what we claim as new therein and desire to secure by Letters Patent is:

1. In a scale, the combination of a plurality of gages provided with indexes of different capacities, an adjustable member for each of said gages provided with a series of index marks corresponding to the index of said gage, and manually-operated means for simultaneously shifting said several adjustable members through distances proportionate to the capacities of the respective gages, substantially as described.

2. In a scale, the combination of a gage provided with integer index divisions, a gage provided with fractional index divisions, an adjustable member for each of said gages provided with a series of index marks corresponding to the index divisions of said gage, and a common means for shifting said two adjustable members through distances proportionate to the capacities of the respective gages, substantially as described.

3. In a scale, the combination of a gage provided with an index, an adjustable member, a series of elements carried by said adjustable member and provided with characters for coöperating with the index of said gage, means for angularly shifting said adjustable member, and positively acting means for maintaining said elements in such position that the characters thereon will be in vertical position in all shifted positions of said adjustable member, substantially as described.

4. In a scale, the combination of a gage provided with index characters, an adjustable member, a series of elements carried by said adjustable member and provided with characters for coöperating with the index characters of said gage, means for angularly shifting said adjustable member, and gearing between the adjustable member and elements for maintaining said elements in such positions that the characters thereon will be in vertical position in all shifted positions of said adjustable member, substantially as described.

5. In a scale, the combination of a plurality of independent gages having dials of different capacities provided with index characters, an adjustable member for each of said gages, a series of elements carried by each adjustable member and provided with characters for coöperating with the index characters of the corresponding gage, means for angularly shifting said several adjustable members through distances proportionate to the capacities of the respective gages, and means for maintaining said elements in such positions that the characters thereon will be in vertical position in all shifted positions of said adjustable members, substantially as described.

6. In a scale, the combination of an integer dial gage, a fractional dial gage, an adjustable ring rotatably mounted on each of said dials and provided with a series of index marks coöperating with the dial index of said gage, and a common means for shifting said two adjustable members through distances proportionate to the capacities of the respective gages, substantially as described.

7. In a scale, the combination of an integer dial gage, a fractional dial gage, an adjustable ring rotatably mounted on each of said dials and provided with a series of index marks coöperating with the dial index of said gage, and a train of gearing connecting said two adjustable members for shifting the latter through distances proportionate to the capacities of the respective gages, substantially as described.

8. In a scale, the combination of a gage provided with index characters, an adjustable member, a series of elements pivotally supported on said adjustable member and provided with characters for coöperating with the index characters of said gage, means for angularly shifting said adjustable member, and a common means for maintaining the characters on said series of elements in vertical position in all shifted positions of said adjustable member, substantially as described.

In testimony whereof we affix our signatures in presence of two witnesses.

HORATIO BONAR OSGOOD.
GUSTAV AYRES.

Witnesses for Horatio Bonar Osgood:
S. MACK SMITH,
JOSEPH S. O'NEIL.

Witnesses for Gustav Ayres:
EARLE M. JEFFREY,
E. A. PANABAKER.